US005583081A

United States Patent [19]
Price et al.

[11] Patent Number: 5,583,081
[45] Date of Patent: Dec. 10, 1996

[54] COPPER-CONTAINING ZEOLITE CATALYSTS

[75] Inventors: Geoffrey L. Price, Baton Rouge, La.; Vladislav Kanazirev, Sofia, Bulgaria

[73] Assignees: Board of Supervisors of Louisiana State University and Agricultural and Mechanical College, Baton Rouge, La.; Bulgarian Academy of Sciences, Sofia, Bulgaria

[21] Appl. No.: 115,192

[22] Filed: Aug. 31, 1993

[51] Int. Cl.$^6$ .................................................. B01J 27/04
[52] U.S. Cl. ............................ 502/61; 502/71; 558/308; 558/315; 564/248; 564/278
[58] Field of Search ........................... 558/308, 315; 564/248, 278; 502/61, 71

[56] References Cited

U.S. PATENT DOCUMENTS 5,149,679  9/1992  Price et al. ................................ 502/61

OTHER PUBLICATIONS

Karge et al., "High–temperature Interaction of Solid Cu Chlorides and Cu Oxides in Mixtures with H–forms of ZSM–5 and Y Zeolites," J. Chem. Soc. Faraday Trans., vol. 88(9), pp. 1345–1351 (1992).

Li et al., "Catalytic Decomposition of Nitric Oxide over Cu–Zeolites," J. Cat., vol. 129, pp. 202–215 (1991).

Li et al., "Temperature–programmed desorption of nitric oxide over Cu–ZSM–5," App. Cat., vol. 76, pp. L1–L8 (1991).

Karge et al., "Introduction of Cations into Zeolites by Solid–State Reaction," Zeolite Chem. & Cat., pp. 43–64 (1991).

Zhang et al., "Adsorption–desorption Properties of Nitrogen Monoxide on Metal Ion–exchanged Zeolites," Chemistry Letters, pp. 851–854 (1992).

Parrillo et al., "Adsorption Studies on Cu–ZSM–5: Characterization of the Unique Properties of Ion–Exchanged Cu," J. Cat., vol. 142, pp. 708–718 (1993).

Primary Examiner—Joseph K. McKane
Attorney, Agent, or Firm—John H. Runnels

[57] ABSTRACT

A catalyst useful in the conversion of nitrogen oxides or in the synthesis of nitriles or imines from amines, formed by preparing an intimate mechanical mixture of a copper (II)-containing species, such as CuO or $CuCl_2$, or elemental copper, with a zeolite having a pore mouth comprising 10 oxygen atoms, such as ZSM-5, converting the elemental copper or copper (II) to copper (I), and driving the copper (I) into the zeolite.

46 Claims, No Drawings

COPPER-CONTAINING ZEOLITE CATALYSTS

The development of this invention was partially funded by the Government under grant no. DE-FG05-92ER14291 awarded by the Department of Energy. The Government may have certain rights in this invention.

This invention pertains to copper-containing zeolite catalysts, particularly to copper-containing zeolite catalysts which are useful for the decomposition of nitrogen oxides (NO$_x$), or in conversion reactions of organic compounds, such as amines.

Nitrogen oxides (NO$_x$) such as nitric oxide (NO) are primary pollutants in emissions from automobiles and from fossil-fuel-burning power plants. Current environmental regulations require control of such emissions. The currently-used technology largely centers on platinum-based catalysts, as well as some copper-based catalysts. Platinum-based catalysts generally require a reducing agent such as ammonia to function properly. Copper-containing zeolites, on the other hand, directly decompose NO to nitrogen and oxygen without the necessity for a reducing agent. Furthermore, the economic advantages of using a catalyst based on copper rather than one based on platinum are considerable.

Zeolitic materials, both natural and synthetic, are known to have catalytic capabilities for various types of chemical conversions. Certain zeolitic materials are ordered, porous, crystalline aluminosilicates having a definite crystalline structure within which there are a large number of small cavities which are interconnected by a number of still smaller channels. These cavities and channels are uniform in size. Because the dimensions of these pores will admit molecules of certain dimensions, while rejecting those of larger dimensions, these materials have come to be known as "molecular sieves," and are used in a variety of ways to take advantage of these properties.

U.S. Pat. No. 3,702,886 describes a family of synthetic zeolites designated as "Zeolite ZSM-5" or simply "ZSM-5," having a characteristic x-ray diffraction pattern and a composition in terms of mole ratios of oxides as follows:

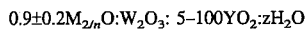

$$0.9 \pm 0.2 M_{2/n} O : W_2 O_3 : 5\text{--}100 Y O_2 : z H_2 O$$

wherein M is a cation, n is the valence of said cation, W is selected from the group consisting of aluminum and gallium, preferably aluminum; Y is selected from the group consisting of silicon and germanium, preferably silicon; and z is between 0 and 40. Crystalline aluminosilicates having the aforesaid composition and characteristic X-ray diffraction pattern are classified as MFI-type zeolites in the Atlas of Zeolite Structure Types by W. M. Meier and D. H. Olson, published by the Structure Commission of the International Zeolite Association (1978). (It is noted that besides aluminum and gallium, the "W" atom may also be boron. The "W" atom will sometimes be referred to as an "anionic tetrahedral atom.") U.S. Pat. No. 3,702,886 was the forerunner to a number of patents relating to synthetic crystalline aluminosilicate zeolites, all of which are characterized by a high, that is 10:1 or greater, silica to alumina molar ratio, high stability, presence of acid sites, and the ability to catalyze many kinds of conversion reactions, such as cracking, isomerization of n-paraffins and naphthenes, polymerization of olefinic and acetylenic compounds, reforming, alkylation, isomerization of polyalkyl substituted aromatics, and disproportionation of aliphatic and alkyl substituted aromatic hydrocarbons. The acid form of a ZSM zeolite may be denoted as an "HZSM."

U.S. Pat. No. 5,149,679 (whose disclosure is largely identical to the disclosure of International PCT Publication No. WO 91/17133, published Nov. 14, 1991), discloses a catalyst useful in the aromatization of light paraffins and other hydrocarbon conversion reactions, formed by preparing an intimate mechanical mixture of a gallium-containing species, such as Ga$_2$O$_3$, with a zeolite having a pore mouth comprising 10 oxygen atoms, such as ZSM-5, preferably followed by treatment with a reducing agent, such as hydrogen.

Li et al., "Catalytic Decomposition of Nitric Oxide over Cu-Zeolites," J. Cat., vol. 129, pp. 202–215 (1991) discloses copper-containing zeolites prepared by aqueous ion exchange of copper salts with ZSM-5, and the use of such a catalyst in the decomposition of NO. See also Li et al., "Temperature-programmed desorption of nitric oxide over Cu-ZSM-5," App. Cat., vol. 76, pp. L1–L8 (1991); Zhang et al., "Adsorption-desorption Properties of Nitrogen Monoxide on Metal Ion-exchanged Zeolites," Chemistry Letters, pp. 851–854 (1992) (not admitted to be prior art); and Parrillo et al., "Adsorption Studies on Cu-ZSM-5: Characterization of the Unique Properties of Ion-Exchanged Cu," J. Cat., vol. 42, pp. 708–718 (1993) (not admitted to be prior art).

Karge et al., "Introduction of Cations into Zeolites by Solid-State Reaction," Zeolite Chem. & Cat., pp. 43–64 (1991) gave a general review of solid-state introduction of cations, including copper, into zeolites. Karge et al., "High-temperature Interaction of Solid Cu Chlorides and Cu Oxides in Mixtures with H-forms of ZSM-5 and Y Zeolites," J. Chem. Soc. Faraday Trans., vol. 88, pp. 1345–1351 (1992) (not admitted to be prior art) described the solid-state interaction of copper chlorides and copper oxides with HZSM-5, in which the mixtures were ground in an agate mortar. Karge et al. apparently did not attempt to convert Cu$^{+2}$ to Cu$^{+1}$, and then drive the Cu$^{+1}$ into the zeolite.

It has been discovered that the preparation of intimate mechanical mixtures of a copper-containing species, such as CuO, CuCl$_2$, or elemental copper, with a zeolite having a pore mouth comprising 10 oxygen atoms, such as ZSM-5, has created efficient catalysts for the decomposition of nitrogen oxides (NO$_x$). These catalysts have also been shown to be effective for the dehydrogenation and condensation of amines. Catalysts in accordance with the present invention have been prepared by making an intimate mechanical mixture of a suitable zeolite with a suitable copper-containing compound.

These catalysts have superior activity in decomposing NO when compared to catalysts prepared by aqueous impregnation and/or ion-exchange with copper salts. Without wishing to be bound by this theory, it is believed that the high activity is at least partly due to a "loading" of up to one copper atom per anionic site in the zeolite. This invention permits such a high level of loading to be achieved where the Cu atoms occupy sites within the zeolitic channels, rather than being dispersed on the exterior of the zeolitic crystal. By contrast, aqueous ion exchange theoretically yields only 1 Cu atom per 2 anionic sites, because aqueous copper ions are stable in the +2 oxidation state; any copper in excess of this 1:2 stoichiometric loading is believed generally to reside outside the zeolitic pore, where it is therefore not catalytically effective.

Furthermore, it is believed that the present invention for the first time allows copper to be driven into the zeolite crystal in the +1 oxidation state, allowing up to "200% loading" of copper in the zeolite. Prior aqueous ion exchange techniques are believed to have driven copper into the zeolite in the +2 oxidation state, allowing up to "100% loading" of copper in the zeolite. ("100% loading" in this context has traditionally meant 1 copper atom in the zeolite structure per every 2 aluminum atoms.) Even if the copper is subsequently reduced to the +1 oxidation state, the loading will remain no higher than 100%. Thus the present invention allows significantly higher loading of copper (I) in the zeolite than has previously been possible.

It is believed that this is the first report of a copper-containing zeolite catalyst in which the ratio of copper atoms at cation sites to anionic tetrahedral atoms in the zeolite crystalline structure is greater than 0.7. Preferably, this ratio is greater than 0.8, more preferably greater than 0.9, most preferably about 1.0.

Catalytic dehydrogenation and condensation of amines over a copper-containing zeolite species have never previously been reported.

Preparation of a quality catalyst in accordance with the present invention has the additional advantage that no wet or liquid-phase procedures are required.

The zeolites used as a base, or starting material, suitably have a silica to alumina molar ratio between 10:1 and 150:1, preferably between 20:1 and 50:1, and may be selected from zeolites of the general formula:

$$1.0 \pm 0.4 M_{2/n}O:Al_2O_3:ySiO_2:zH_2O$$

wherein M is a cation of valence n, y is between 5 and 150, and z is between 0 and 40. The cation M is preferably $H^+$ or $NH_4^+$.

The zeolite should preferably have a pore mouth comprising 10 oxygen atoms, and is preferably a ZSM-5, ZSM-11, or ZSM-12 zeolite. For descriptions of these zeolites and methods of making them, see U.S. Pat. No. 3,702,886, U.S. Pat. No. 3,709,979, and U.S. Pat. No. 3,970,544.

The sources of copper used by the inventors to date have been CuO and $CuCl_2$. Other possible sources of copper include copper (II) salts such as $Cu(NO_3)_2$, $Cu(OH)_2$, and other $Cu^{+2}$ salts, as well as elemental copper. The amount of copper present in the catalyst, on an elemental basis by weight, may vary between 0.05% and 200%, and is preferably between 0.5% and 15%.

A binder may be added to aid in fabricating the catalysts into a suitable form. Binder materials which may be used include clays, alumina, silica, silica-alumina, and graphite. The finished catalyst may contain binder amounts of between zero and about 95% by weight, more preferably between about 10% and about 50% by weight. The preferred binder material is silica, which can be incorporated in colloidal form from materials such as Ludox™ AS-30 or AS-40, available from DuPont. Silica is known not to interfere with the activity of other zeolite catalysts, and additionally is known not promote side reactions, such as coking. Ceramic monoliths, commonly used as supports for exhaust gas catalytic operations, may also be used in the final fabrication.

An "intimate mechanical mixture" or "intimate physical mixture" of different components is one whose degree of mixing is such as to result in a significant increase in catalytic activity over the catalytic activity of a simple, brief mixture of those same components. Suitable apparatus for making intimate mechanical mixtures include ball mills, hammer mills, roller mills, ribbon mills, gear mills, jaw crushers, gyratory crushers, cone crushers, pan crushers, single or two roll crushers, mortar and pestle, vibrating mills, rotary crushers, or bowl mills. An intimate mechanical mixture of the components of the present invention gave a catalyst with unexpected properties, namely higher nitrogen oxide decomposition rates, higher copper loading in a zeolite than could previously be achieved, and the ability to catalyze amine dehydrogenation/condensation into nitriles and/or imines.

The zeolite base used in preparing the catalysts was a zeolite sold commercially by UOP under the name MFI, lot number 13923-57C. This zeolite was reported by the manufacturer to be a ZSM-5 zeolite having a $SiO_2/Al_2O_3$ molar ratio of 40, which had been acid washed and calcined. Measurements in the inventors' laboratories gave a $SiO_2/Al_2O_3$ molar ratio of 42, a figure which was used in the calculations reported below.

All or most zeolites, particularly acidic zeolites, having a pore mouth comprising 10 oxygen atoms should also work in preparing catalysts of the present invention.

Copper-containing catalysts were prepared by ball-milling CuO or $CuCl_2$ with HZSM-5 for three hours. The chamber of the ball-mill was 3 inches deep, had a 5 inch inner diameter, and was rotated at 86 rpm. About twenty grams of HZSM-5 material were placed in the ball-mill, and enough CuO or $CuCl_2$ was added so that the ratio of copper atoms to aluminum atoms in the zeolitic framework was 1:1. (A lower ratio could also be used.) This ratio also corresponds closely to one Cu atom per anionic tetrahedral site, and to one Cu atom per zeolitic proton, since the purely proton form of zeolite was used. Sixty-five stainless steel balls were added (30, ¼ inch diameter; 20, ⅜ inch diameter; before 15, ½ inch diameter) before the chamber was closed.

After the ball-milling process, the powdered samples were pelletized, partially crushed in a mortar and pestle, and sieved to 40–60 mesh particles. In all characterization and reactor studies, the 40–60 mesh particles were used.

Copper was driven into the zeolite either by thermal treatment or by treatment with an amine. In either case, copper ions migrate most easily in the +1 oxidation state, because the −1 anionic zeolite sites are largely separated in space. Although electron redistribution may occur within the zeolite, the anionic sites can be roughly considered to be univalent point sources.

The treatment of the ball-milled zeolite was designed to take advantage of this phenomena. CuO-containing materials were formed most successfully via thermal treatment. Since Cu was in the +2 oxidation state in the starting material, the thermal treatment facilitated conversion of CuO to $Cu_2O$, with the release of $O_2$. In the absence of a reducing agent, at 500° C., $Cu_2O$ is thermodynamically favored at oxygen partial pressures between about $10^{-15}$ and $10^{-11}$ atmospheres. At 600° C., $Cu_2O$ is favored at oxygen partial pressures between about $10^{-13}$ and $10^{-9}$ atmospheres; and at 700° C., between about $10^{-11}$ and $10^{-7}$ atmospheres. Larger $O_2$ pressures cause CuO to be favored, while lower pressures favor Cu metal formation. Thus, a good vacuum or a clean purge gas are preferably used to make the conversion process thermodynamically possible. Alternatively, if the purge gas is not sufficiently clean (e.g., if it has too high a concentration of oxygen), a trace amount of a reducing agent such as $H_2$ or $NH_3$ may be added to the purge gas. At higher temperatures, the metal can be formed, which should be avoided as there is little propensity for a zero valent atom to enter the zeolite.

Kinetics also plays an important role. The rate at which $Cu_2O$ is formed increases with temperature. Furthermore, the smaller the CuO particles in the starting material, the faster the process can occur. Thus, ball-milling (or other means for creating a fine powder) is advantageous from a kinetic standpoint.

By contrast, work by the inventors to date using $Cu_2O$ directly as the starting material has largely been unsuccessful, probably because the $Cu_2O$ phase is too thermally stable, and because $Cu^+$ ions are too tightly bound in the crystalline matrix. However, where $Cu^+$ is formed on the surface of CuO particles (e.g., via heat treatment), the ions can migrate into the zeolite before a strong $Cu_2O$ crystal lattice has had an opportunity to form. As copper migrates into the zeolite, zeolitic protons are replaced with $Cu^+$ ions, and the displaced $H^+$ ions combine with oxygen anions to form water. Thus the close proximity of the zeolite also provides a sink for the $Cu^+$ product of the thermal treatment process, so that the reaction is continually forced in a forward direction. There should be a careful balance between rate of formation of $Cu^+$ and the rate at which the zeolite accepts the $Cu^+$. Higher temperatures favor the former, and ball-milling favors the latter. A suitable temperature that does not produce either $Cu^°$ or $Cu^+$ too quickly should be chosen. Furthermore, there is a minimum temperature, not only with respect to producing catalyst in a practical time frame, but also for mobilizing the zeolitic protons sufficiently that they may readily be replaced with $Cu^+$. The temperature used also depends on the degree of impurities present in the gas. The temperature should be in the range 500° C. to 750° C., with a preferred temperature range of about 600° C. to about 650° C., most preferably about 600° C. The ultimate degree of intimate physical contact is also limited because the zeolitic structure can eventually be degraded by the milling operation. The preferred degree of milling is slightly less than that at which a substantial degree of degradation of zeolite into silica and alumina occurs. When such degradation occurs will depend on the specific apparatus used. With the apparatus described above, such degradation might be expected after about 10–12 hours.

The preferred method for driving copper into the zeolite was treating $CuCl_2$-containing material with amine. The materials were first treated near room temperature with a He stream partially saturated with an alkylamine. It should be noted that the raw material retained considerable water in the zeolitic pores as the general result of handling in a humid environment; the water present limited the amount of alkylamine which could be adsorbed. There may be an interaction between the alkylamine and the $CuCl_2$; the $CuCl_2$-containing material was considerably more amenable to this type of treatment than was the copper oxide-containing material. After the amine treatment, the material was heated slowly to 500°–600° C. in an inert environment, which resulted in the successful placement of $Cu^+$ ions in the zeolite. The amine may act as a weak reducing agent, facilitating reduction of $Cu^{+2}$ to $Cu^{+1}$. Substitution of ammonia for the amine may also be possible.

Once the copper has been driven into the zeolite, the resulting material is useful for the decomposition of $NO_x$, or for the dehydrogenation/condensation of amines.

EXAMPLES

Catalyst Preparation

A. Thermal Treatment of CuO/HZSM-5

21.66 grams of UOP MFI zeolite in the proton form (containing 8.3% water by weight) were placed in a ball-milling chamber 3 inches deep by 5 inches in diameter. 1.21 g CuO (Aldrich, ACS reagent grade) was added to the chamber, along with 65 stainless steel balls (30 balls, ¼ inch diameter; 20 balls, ⅜ inch diameter; 15 balls, ½ inch diameter). The ball-mill was covered and rotated at 86 rpm for 3 hours. The powdered product was separated from the balls, pelletized, crushed in a mortar and pestle, and sieved to 40–60 mesh.

The copper was then driven into the zeolite by placing 250 mg of the 40–60 mesh material in a quartz U-tube reactor with a quartz frit on the bottom and quartz wool on the top. A flow of 20 cc/min ultra-high purity helium (Lincoln Big Three, Inc.) was established. The temperature was then raised from room temperature to 650° C. by linear temperature programming at 5° C./min; and the temperature was then held constant at 650° for 11 hours.

A similar sample of the same material was prepared by the same thermal treatment in a microbalance, and subjected to analysis by n-propylamine, temperature-programmed desorption. The analytical procedure did not detect any remaining zeolitic protons.

B. Treatment with Alkyl Amine

Using the same ball-mill and ball set as described in Example A, a $CuCl_2$/HZSM-5 material was prepared with 20 g HZSM-5 and 2.05 g $CuCl_2$ (Aldrich, ACS reagent grade), rotating the ball-mill for 3 hours. The powdered product was retrieved, pelletized, crushed to 40–60 mesh, and approximately 15 mg were loaded on the pan of a Perkin-Elmer TGA-7 microbalance. The sample was heated to 50° C., and a purge flow of 100 cc/min ultra-high-purity helium was established. 50 cc/min of the microbalance purge flow was detoured through a room temperature bubbler containing n-propylamine (Aldrich, ACS reagent grade) to carry n-propylamine to the sample. The n-propylamine flow continued for 10 minutes, after which the flow was returned to pure helium for 10 minutes. A linear temperature program was started at 5° C./min, and the temperature was raised to 550° C. to drive the copper into the zeolite. The microbalance trace showed typical bands for water and low-temperature n-propylamine desorption, and two high-temperature bands which were not identified. A subsequent n-propylamine temperature-programmed desorption experiment did not detect any remaining zeolitic protons.

C. Ion-Exchange Catalyst

The catalyst of Example A was compared with a catalyst made by conventional aqueous ion-exchange techniques. To make the ion-exchanged catalyst, a sample of about 20 grams HZSM-5 was slurried in an aqueous solution containing 5 equivalents of $Cu^{+2}$ as $CuCl_2$. $NH_4OH$ was used to maintain a pH of 5–6. After 16 hours, the solid was filtered, and a new solution of 5 equivalents was slurried with the catalyst for 23 hours. The solution was again filtered, followed by a third and final ion exchange for 23 hours with 5 equivalents of $Cu^{+2}$. The solid was washed briefly with water, dried at 200° C. for two hours, then calcined at 600° C. overnight in air. The catalyst was pelletized, crushed, and sieved to 40–60 mesh.

To try to achieve as high an activity as possible to make a meaningful comparison, the pretreatment procedure of Li and Hall, J. Cat., vol. 129, pp. 202–215 (1991) was used. Briefly, the catalyst was treated at 500° C. for two hours in 4% CO in helium. We have confirmed that the CO reduction procedure does enhance catalyst activity.

D. Elemental-Copper-Based Catalyst

Twenty grams (dry basis) of Union Carbide MFI zeolite will be mixed with one gram of powdered copper metal, and placed in the same ball mill as described in Example A above, and the mixture will be ball-milled for about three hours. The resulting powder will be pelletized, ground, and sieved to 40–60 mesh.

250 mg of the 40–60 mesh particles will be placed in a quartz reactor as described in Example A, and a flow of 20 cc/min ultra-high purity helium will be established. The temperature will be raised slowly (e.g., 5° C./min) to 600° C. Then 1.04% NO in helium at 20 cc/min will be switched into the reactor in place of the ultra-high purity helium, and the NO-containing flow will continue for one hour (or alternatively two hours) at 600° C. The flow will then be switched back to the ultra-high purity helium, and the catalyst will remain overnight in the flowing helium at 600° C. The catalyst will then be used as described in Example E below in NO decomposition activity, and as described in Example F below for amine conversion. It will also be tested for proton acidity with n-propylamine temperature-programmed desorption.

Catalytic Reactions

E. NO Decomposition

To evaluate the activity of the catalysts, 1.04% NO in helium (Matheson) was flowed over a 250 mg sample of catalyst at 20 cc/min for one hour at 500° C. The reactor temperature was then lowered to 350 ° C., a temperature at which the kinetic comparison was made. The products were analyzed on a molecular sieve column at room temperature with a thermal conductivity detector. (The material balance was difficult because of production of side products such as $NO_2$ and $N_2O$ which are difficult to chromatograph. A preferred activity indicator was to monitor the production of $N_2$, a species which does not undergo further reaction once formed.) Table I gives a comparison of the ion-exchanged catalyst of Example C to the catalyst of Example A. The catalyst of Example A was nearly 1 ½ times as active as the conventional ion-exchanged material.

TABLE I

Conversion of NO over Cu-Modified HZSM-5's at 350° C.

| Catalyst | Time on Stream at 350° C. (min) | $N_2$ Produced/ Theoretical Maximum $N_2$ |
|---|---|---|
| $CuCl_2$/ZSM-5 (Ion-Exchanged) | 20 | 0.0432 |
| | 39 | 0.0366 |
| | 46 | 0.0366 |
| | 70 | 0.0363 |
| | 150 | 0.0353 |
| CuO/ZSM-5 (Example A) | 100 | 0.0532 |
| | 113 | 0.0529 |
| | 171 | 0.0518 |
| | 196 | 0.0518 |

F. Dehydrogenation/Condensation of Alkylamines

A catalyst prepared by a technique similar to that described in Example A was used in n-propylamine dehydrogenation/condensation. The only modifications in the preparation technique were that the maximum thermal treatment temperature was 600° C., and a vacuum was used in place of ultra-high-purity helium 100 mg of catalyst was placed between quartz wool plugs in a U-tube type reactors and the U-tube was mounted to a recirculating batch reactor system constructed primarily of pyrex glass. After the copper was driven into the zeolite under vacuum, the reactor was cooled to 320° C., the U-tube was back-filled with helium to atmospheric pressure, and the U-tube was isolated from the remainder of the batch recirculation system with a stopcock arrangement. The batch system was filled with 11 torr n-propylamine diluted to 800 torr with helium. Reaction was then started at 320° C. by diverting the contents of the recirculating system through the U-tube reactor. Samples were withdrawn through an evacuated line to a gas injection valve mounted on a Hewlett-Packard 5890 II gas chromatograph equipped with a 50 meter PONA column and an FID detector. Identification of unknown components was accomplished with an off-line GC-MS system. Samples for the GC-MS system were placed in pre-evacuated glass ampoules with a septum for syringe withdrawal of the contents. Table II shows the results of the experiment on the virgin catalyst, which is believed to contain $Cu^+$ ions. Table II also gives the results of a subsequent experiment in which the catalyst was further treated in 200 torr of circulating $H_2$ at 450° C. for 3 hours followed by evacuation, and reactor filling as before. This catalyst was expected to contain $Cu^°$ metal atoms. As can be seen, although the overall conversion was almost identical in both cases (91.0% versus 91.4%) after similar reaction times (123 versus 119 minutes), the selectivity changed markedly from nitriles and alkenes to other amines, particularly dipropylamine. Aliphatic nitriles are important industrial chemicals used, for example, as starting materials for polymers as well as in the synthesis of complex chemicals including pharmaceuticals and pesticides, such as flopropione, ketoprofen, amprolium, and diazinon. Imines are intermediates in the production of substituted amines, and in the production of antioxidants and anti-ozonants for synthetic rubbers, such as those sold under the trade names Vulkanox 4020, Flexone, and Santoflex.

TABLE II

Conversion of Propylamine over Cu Modified HZSM-5 at 320° C.

| | Cu/ZSM-5 | Cu/ZSM-5 Reduced in $H_2$ |
|---|---|---|
| Time (min) | 123 | 119 |
| Product Composition (wt %) | | |
| Unreacted Propylamine | 9.0 | 8.3 |
| Dipropylamine | 1.2 | 45.2 |
| Other amines | 8.0 | 27.7 |
| $C_2$–$C_6$ alkenes | 21.3 | 9.0 |
| Propionitrile | 18.1 | 1.8 |
| C-6 Nitrile (2-methylpentanenitrile)* | 38.2 | 2.5 |
| C-6 Imine (N-propylidenpropylimine)* | 4.2 | 12.5 |
| Propylamine Conversion | 91.0 | 91.4 |
| Selectivity for Nitriles | 50.9 | 4.7 |
| Selectivity for C-6 Nitrile | 42.0 | 2.7 |

*Absolute identification of these components is not certain, but is likely. The general classification is certain in both cases.

Note that one of the condensation products, believed to be 2-methylpentanenitrile, is apparently the result of a novel and unexpected hydrocarbon chain extension reaction. Simple condensation also occurred, resulting in dialkyl amines; this reaction followed by dehydrogenation led to a long-chain imine (a reaction product different from the extended chain nitrile). It is believed that this is the first report of a nitrile with an extended hydrocarbon chain resulting from an amine condensation.

A "cation site" of a zeolite is a site of an exchangeable or exchanged cation, as described in U.S. Pat. No. 3,702,886. The location of such a cation site need not necessarily be a geometrically fixed location on the zeolite structure. Cations at such a site may include $NH_4^+$ oe $H^{30}$ before reaction, and are believed to include $Cu^+$ (copper (I)) after reaction according to the method of the present invention; it is possible that some $Cu^{+2}$ (copper (II)) may also be present at such sites, even after reaction).

All references cited in this specification are hereby incorporated by reference.

We claim:

1. A process for making a copper-containing zeolite catalyst; comprising the sequential steps of:
   (a) making an intimate mechanical mixture of a zeolite with a pore mouth comprising 10 oxygen atoms, and a composition selected from the group consisting of a compound comprising copper (II), and elemental copper;
   (b) converting some or all of the copper (II) or elemental copper to copper (I); and
   (e) causing some or all of the copper (I) to migrate to a cation site of the zeolite.

2. A process as recited in claim 1, wherein said zeolite is selected from the group consisting of ZSM-5, ZSM-11, and ZSM-12.

3. A process as recited in claim 1, wherein said zeolite comprises ZSM-5.

4. A process as recited in claim 1, wherein said composition is selected from the group consisting of a copper (II) salt and copper (II) oxide.

5. A process as recited in claim 4, wherein said composition comprises copper (II) oxide.

6. A process as recited in step 4, wherein said composition comprises copper (II) chloride.

7. A process as recited in claim 1, wherein said composition comprises elemental copper.

8. A process as recited in claim 1, wherein said zeolite comprises ZSM-5, and wherein said composition comprises copper (II) oxide.

9. A process as recited in claim 1, wherein said zeolite comprises ZSM-5, and wherein said composition comprises copper (II) chloride.

10. A process as recited in claim 1, wherein said zeolite comprises ZSM-5, and wherein said composition comprises elemental copper.

11. A copper-containing zeolite prepared by the sequential steps of:
    (a) making an intimate mechanical mixture of a zeolite with a pore mouth comprising 10 oxygen atoms, and a composition selected from the group consisting of a compound comprising copper (II), and elemental copper;
    (b) converting some pr all of the copper (II) or elemental copper to copper (I); and
    (c) causing some or all of the copper (I) to migrate to a cation site of the zeolite.

12. A catalyst as recited in claim 11, wherein said zeolite is selected from the group consisting of ZSM-5, ZSM-11, and ZSM-12.

13. A catalyst as recited in claim 11, wherein said zeolite comprises ZSM-5.

14. A catalyst as recited in claim 11, wherein said composition is selected from the group consisting of a copper (II) salt and copper (II) oxide.

15. A catalyst as recited in claim 14, wherein said composition comprises copper (II) oxide.

16. A catalyst as recited in claim 14, wherein said composition comprises copper (II) chloride.

17. A catalyst as recited in claim 11, wherein said composition comprises elemental copper.

18. A catalyst as recited in claim 11, wherein said zeolite comprises ZSM-5, and wherein said composition comprises copper (II) oxide.

19. A catalyst as recited in claim 11, wherein said zeolite comprises ZSM-5, and wherein said composition comprises copper (II) chloride.

20. A catalyst as recited in claim 11, wherein said zeolite comprises ZSM-5, and wherein said composition comprises elemental copper.

21. A copper-containing zeolite catalyst prepared by making an intimate mechanical mixture of:
    (a) a zeolite with a pore mouth comprising 10 oxygen atoms; and
    (b) a composition comprising a copper-containing compound or elemental copper; wherein the ratio of copper atoms at cation sites in the zeolite crystalline structure to anionic tetrahedral atoms in the zeolite crystalline structure is greater than 0.7.

22. A catalyst as recited in claim 21, wherein said zeolite is selected from the group consisting of ZSM-5, ZSM-11, and ZSM-12.

23. A catalyst as recited in claim 21, wherein said zeolite comprises ZSM-5.

24. A process for dehydrogenation of an alkylamine, condensation of an alkylamine, or both dehydrogenation and condensation of an alkylamine; to a nitrile, an imine, or both a nitrile and an imine; which comprises contacting the alkylamine under conversion conditions with a material comprising a catalyst as recited in claim 11.

25. A process as recited in claim 24, wherein said alkylamine is condensed to a nitrile having a longer hydrocarbon chain than the hydrocarbon chain of said alkylamine.

26. A process for dehydrogation of an alkylamine, condensation of an alkylamine, or both dehydrogation and condensation of an alkylamine; to a nitrile, an imine, or both a nitrile and an imine; which comprises contacting the alkylamine under conversion conditions with a material comprising a catalyst as recited in claim 13.

27. A process as recited in claim 26, wherein said alkylamine is condensed to a nitrile having a longer hydrocarbon chain than the hydrocarbon chain of said alkylamine.

28. A process for dehydrogenation of an alkylamine, condensation of an alkylamine, or both dehydrogenation and condensation of an alkylamine; to a nitrile, an imine, or both a nitrile and an imine; which comprises contacting the alkylamine under conversion conditions with a material comprising a catalyst as recited in claim 15.

29. A process as recited in claim 28, wherein said alkylamine is condensed to a nitrile having a longer hydrocarbon chain than the hydrocarbon chain of said alkylamine.

30. A process for dehydrogenation of an alkylamine, condensation of an alkylamine, or both dehydrogenation and condensation of an alkylamine; to a nitrile, an imine, or both a nitrile and an imine; which comprises contacting the alkylamine under conversion conditions with a material comprising a catalyst as recited in claim 16.

31. A process as recited in claim 30, wherein said alkylamine is condensed to a nitrile having a longer hydrocarbon chain than the hydrocarbon chain of said alkylamine.

32. A process for dehydrogenation of an alkylamine, condensation of an alkylamine, or both dehydrogenation and condensation of an alkylamine; to a nitrile, an imine, or both a nitrile and an imine; which comprises contacting the alkylamine under conversion conditions with a material comprising a catalyst as recited in claim 17.

33. A process as recited in claim 32, wherein said alkylamine is condensed to a nitrile having a longer hydrocarbon chain than the hydrocarbon chain of said alkylamine.

34. A process for dehydrogenation of an alkylamine, condensation of an alkylamine, or both dehydrogenation and condensation of an alkylamine; to a nitrile, an imine, or both a nitrile and an imine; which comprises contacting the alkylamine under conversion conditions with a material comprising a catalyst as recited in claim 23.

35. A process as recited in claim 34, wherein said alkylamine is condensed to a nitrile having a longer hydrocarbon chain than the hydrocarbon chain of said alkylamine.

36. A catalyst as recited in claim 21, wherein the ratio of copper atoms at cation sites in the zeolite crystalline structure to anionic tetrahedral atoms in the zeolite crystalline structure is greater than 0.8.

37. A catalyst as recited in claim 36, wherein said zeolite is selected from the group consisting of ZSM-5, ZSM-11, and ZSM-12.

38. A catalyst as recited in claim 36, wherein said zeolite comprises ZSM-5.

39. A catalyst as recited in claim 36, wherein the ratio of copper atoms at cation sites in the zeolite crystalline structure to anionic tetrahedral atoms in the zeolite crystalline structure is greater than 0.9.

40. A catalyst as recited in claim 39, wherein said zeolite is selected from the group consisting of ZSM-5, ZSM-11, and ZSM-12.

41. A catalyst as recited in claim 39, wherein said zeolite comprises ZSM-5.

42. A catalyst as recited in claim 36, wherein the ratio of copper atoms at cation sites in the zeolite crystalline structure to anionic tetrahedral atoms in the zeolite crystalline structure is about 1.0.

43. A catalyst as recited in claim 42, wherein said zeolite is selected from the group consisting of ZSM-5, ZSM-11, and ZSM-12.

44. A catalyst as recited in claim 42, wherein said zeolite comprises ZSM-5.

45. A process for dehydrogation of an alkylamine, condensation of an alkylamine, or both dehydrogation and condensation of an alkylamine; to a nitrile, an imine, or both a nitrile and an imine; which comprises contacting the alkylamine under conversion conditions with a material comprising a catalyst as recited in claim 44.

46. A process as recited in claim 45, wherein said alkylamine is condensed to a nitrile having a longer hydrocarbon chain than the hydrocarbon chain of said alkylamine.

* * * * *